US012696124B2

(12) United States Patent
Lopez et al.

(10) Patent No.: US 12,696,124 B2
(45) Date of Patent: Jul. 28, 2026

(54) WAKE-UP PACKET BASED COORDINATION OF BROADCASTING DEVICE RESPONSES

(71) Applicant: Telefonaktiebolaget LM Ericsson (publ), Stockholm (SE)

(72) Inventors: Miguel Lopez, Solna (SE); Guido Roland Hiertz, Aachen (DE); Leif Wilhelmsson, Lund (SE); Henrik Sjöland, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 453 days.

(21) Appl. No.: 17/626,280

(22) PCT Filed: Jul. 12, 2019

(86) PCT No.: PCT/EP2019/068918
§ 371 (c)(1),
(2) Date: Jan. 11, 2022

(87) PCT Pub. No.: WO2021/008676
PCT Pub. Date: Jan. 21, 2021

(65) Prior Publication Data
US 2022/0295333 A1     Sep. 15, 2022

(51) Int. Cl.
*H04W 28/02*      (2009.01)
*H04W 48/10*      (2009.01)
*H04W 52/02*      (2009.01)

(52) U.S. Cl.
CPC ....... *H04W 28/0221* (2013.01); *H04W 48/10* (2013.01); *H04W 52/0219* (2013.01)

(58) Field of Classification Search
CPC ............. H04W 28/0221; H04W 48/10; H04W 52/0219
See application file for complete search history.

(56) References Cited

U.S. PATENT DOCUMENTS

2002/0068544 A1*   6/2002   Barzilay ............. H04L 12/2818
                                                          455/406
2007/0087833 A1*   4/2007   Feeney .................. A63F 13/85
                                                          463/9
(Continued)

FOREIGN PATENT DOCUMENTS

EP          3493603 A1 *   6/2019   ............ H04W 52/02
EP          3506712 A1     7/2019
(Continued)

OTHER PUBLICATIONS

Morioka, Hitoshi, et al., "A PAR Proposal for Enhanced Broadcast Service (eBCS)", doc.: IEEE 802.11-18/0825r9, IEEE P802.11 Wireless LANs, Nov. 2018, 1-4.
(Continued)

*Primary Examiner* — Siming Liu
(74) *Attorney, Agent, or Firm* — Murphy, Bilak & Homiller, PLLC

(57)          ABSTRACT

A wireless-local area network access point (101, 102; 800; 1100) sends at least one wake-up packet for activating broadcasting devices (21, 22, 23, 24) in vicinity of the wireless-local area network access point (101, 102; 800; 1100). In response to the at least one wake-up packet, the wireless-local area network access point (101, 102; 800; 1100) receives responses from the broadcasting devices (21, 22, 23, 24). Each response comprises an identifier of the broadcasting device (21, 22, 23, 24) sending the response. The at least one wake-up packet coordinates the sending of the responses by the broadcasting devices (21, 22, 23, 24) with respect to each other.

30 Claims, 7 Drawing Sheets

(56)                    References Cited

U.S. PATENT DOCUMENTS

| | | | |
|---|---|---|---|
| 2009/0013062 A1* | 1/2009 | Blatherwick | ......... H04L 67/303 |
| | | | 709/222 |
| 2014/0050133 A1 | 2/2014 | Jafarian et al. | |
| 2017/0339103 A1* | 11/2017 | Rimmer | .................. H04L 45/16 |
| 2018/0359778 A1* | 12/2018 | Splitz | ................... H04W 74/04 |
| 2019/0059110 A1* | 2/2019 | Zhang | .................. H04W 16/14 |
| 2020/0267650 A1* | 8/2020 | Lee | .................. H04W 52/0229 |

FOREIGN PATENT DOCUMENTS

| | | |
|---|---|---|
| RU | 2635888 C2 | 11/2017 |
| WO | 2014074919 A1 | 5/2014 |
| WO | 2018056674 A1 | 3/2018 |
| WO | 2018070820 A1 | 4/2018 |
| WO | 2018084644 A1 | 5/2018 |
| WO | 2018182312 A1 | 10/2018 |

OTHER PUBLICATIONS

Patil, Abhishek, et al., "Use Case Document: AP tagged UL forwarding", doc.: IEEE 802.11-19/0894r1, Submission, May 2019, 1-4.
Ando, Kazuma, et al., "RFID Radio Frequency Identification", Nikkei Byte, No. 250 (JP), Nikkei Business Publications, Inc., Mar. 2004, 1-4.
Patil, Abhishek, et al., "Use Case Document: AP tagged UL forwarding", doc.: IEEE 802.1 1-1910894r0, Submission, May 14, 2019, 1-4.
Song, Taewon, et al., "Considerations for WUR Response", doc.: IEEE 802.11-1711359r1, Submission, Nov. 6, 2017, 1-11.
"Notice of Reasons for Rejection", JP Application No. 2022-500819, English Translation, Feb. 28, 2023, 1-4.

* cited by examiner

710 — CONFIGURE WUP(S)

720 — SEND WUP(S)

730 — RECEIVE RESPONSES

810 — MODULE 1: CONFIGURING OF WUP(S)

820 — MODULE 2: SENDING OF WUP(S)

830 — MODULE 3: RECEIVING OF RESPONSES

800

ACCESS POINT

WAKE-UP PACKET BASED COORDINATION OF BROADCASTING DEVICE RESPONSES

TECHNICAL FIELD

The present invention relates to methods for controlling WLAN broadcasting and to corresponding devices, systems, and computer programs.

BACKGROUND

In the WLAN (Wireless Local Area Network) technology as specified in the IEEE 802.11 standards family, Enhanced Broadcast Service (eBCS) are being specified as part of the 802.11bc amendment. The eBCS technology relates to scenarios that require efficient distribution of local information, such as information announcement systems in public locations, e.g., airports or stadiums, sensor information collection, e.g., asset tracking, non-safety related transportation applications operating in unlicensed bands, or multi-media broadcast.

The eBCS technology is based on modifications of the IEEE 802.11 medium access control (MAC) that enable transmission and reception of data in an infrastructure BSS (Basic Service Set) in situations without association of transmitter and receiver. The eBCS technology is for example described in IEEE submission 802.11-18/0825r9 by Marc Emmelmann et al., entitled "A PAR Proposal for Enhanced Broadcast Service (eBCS)" (November 2018), A specific use case involves WLAN based broadcasting devices, e.g., tracking tags. Such use case is for example described in IEEE submission 802.11-18/0894r1 by Abhishek Patil et al., entitled "Use Case Document: AP tagged UL forwarding" (May 2019) The tracking tags are typically implemented as pre-configured low-cost, low-power devices that automatically connect to a tracking server through an eBCS AP, without requiring any connectivity setup, association, or scanning process. Such broadcasting devices may be used to track various objects, e.g., goods in shipment or production, luggage, or vehicles. For example, a tracking tag may be attached to a suitcase to enable tracking of the suitcase as it is transported by air. When the suitcase arrives at an airport the tracking tag will broadcast a message containing an identifier (ID) of the tracking tag. If the message is received by an eBCS AP, the eBCS AP may attach metadata, e.g., indicating time and/or location of receiving the message, and forward the message with the attached metadata to the tracking server.

The tracking tags are typically battery powered, and power efficiency is thus an important aspect. Since functionality of the tracker tags is limited to broadcasting the message with ID, it is possible that the tracking tags use a power efficient radio architecture with a primary connectivity radio (PCR) transmitter, e.g., supporting 802.11a, 802.11g, 802.11n, 802.11ac, and/or 802.11ax modes, and a wake-up radio receiver (WURx), e.g., supporting only a 802.11ba mode. In this case, the eBCS AP may regularly broadcast wake-up packets (WUPs), and when a tracking tag receives a WUP, it responds by sending a message containing its ID, which can then be received by the eBCS AP.

While the above-mentioned architecture using a WURx and a primary WLAN transmitter allows for achieving higher power efficiency as compared to an architecture using a PCR transmitter, problems may arise due to the tracking tag not being able to perform an LBT (listen-before-talk) procedure before sending the response with the ID, because the WURx is not capable of receiving OFDM (Orthogonal Frequency Division Multiplexing) transmissions like used in the PCR. This may result in excessive collisions among the response from different tracking tags and/or in collisions with other transmissions.

Accordingly, there is a need for techniques which allow for efficiently controlling transmissions by broadcasting devices having limited receiver capabilities.

SUMMARY

According to an embodiment, a method of controlling broadcasting devices is provided. According to the method, a WLAN access point sends at least one wake-up packet for activating broadcasting devices in vicinity of the access point. In response to the at least one wake-up packet, the access point receives responses from the broadcasting devices. Each response comprises an identifier of the broadcasting device sending the response. The at least one wake-up packet coordinates the sending of the responses by the broadcasting devices with respect to each other.

According to a further embodiment, a method of controlling a broadcasting device is provided. According to the method, the broadcasting device receives at least one wake-up packet for activating the broadcasting device from a WLAN access point. In response to the at least one wake-up packet, the broadcasting device sends a response comprising an identifier of the broadcasting device. The at least one wake-up packet coordinates the sending of the response by the broadcasting device with respect to sending of responses to the at least one wake-up packet by one or more other broadcasting devices.

According to a further embodiment, a WLAN access point is provided. The access point is configured to send at least one wake-up packet for activating broadcasting devices in vicinity of the access point. Further, the access point is configured to receive, in response to the at least one wake-up packet, responses from the broadcasting devices. Each response comprises an identifier of the broadcasting device sending the response. The at least one wake-up packet coordinates the sending of the responses by the broadcasting devices with respect to each other.

According to a further embodiment, a WLAN access point is provided. The WLAN access point comprises at least one processor and a memory. The memory contains instructions executable by said at least one processor, whereby the WLAN access point is operative to send at least one wake-up packet for activating broadcasting devices in vicinity of the access point. Further, the memory contains instructions executable by said at least one processor, whereby the WLAN access point is operative to receive, in response to the at least one wake-up packet, responses from the broadcasting devices. Each response comprises an identifier of the broadcasting device sending the response. The at least one wake-up packet coordinates the sending of the responses by the broadcasting devices with respect to each other.

According to a further embodiment, a broadcasting device is provided. The broadcasting device is configured to receive at least one wake-up packet for activating the broadcasting device from a WLAN access point. Further, the broadcasting device is configured to send, in response to the at least one wake-up packet, a response comprising an identifier of the broadcasting device. The at least one wake-up packet coordinates the sending of the response by the broadcasting device with respect to sending of responses to the at least one wake-up packet by one or more other broadcasting devices.

According to a further embodiment, a broadcasting device is provided. The broadcasting device comprises at least one processor and a memory. The memory contains instructions executable by said at least one processor, whereby the broadcasting device is operative to receive at least one wake-up packet for activating the broadcasting device from a WLAN access point. Further, the memory contains instructions executable by said at least one processor, whereby the broadcasting device is operative to send, in response to the at least one wake-up packet, a response comprising an identifier of the broadcasting device. The at least one wake-up packet coordinates the sending of the response by the broadcasting device with respect to sending of responses to the at least one wake-up packet by one or more other broadcasting devices.

According to a further embodiment, an object is provided. The object comprises a broadcasting device. The broadcasting device may be permanently or removably attached to the object. The broadcasting device is configured to receive at least one wake-up packet for activating the broadcasting device from a WLAN access point. Further, the broadcasting device is configured to send, in response to the at least one wake-up packet, a response comprising an identifier of the broadcasting device. The at least one wake-up packet coordinates the sending of the response by the broadcasting device with respect to sending of responses to the at least one wake-up packet by one or more other broadcasting devices.

According to a further embodiment of the invention, a computer program or computer program product is provided, e.g., in the form of a non-transitory storage medium, which comprises program code to be executed by at least one processor of a WLAN access point. Execution of the program code causes the WLAN access point to send at least one wake-up packet for activating broadcasting devices in vicinity of the access point. Further, execution of the program code causes the WLAN access point to receive, in response to the at least one wake-up packet, responses from the broadcasting devices. Each response comprises an identifier of the broadcasting device sending the response. The at least one wake-up packet coordinates the sending of the responses by the broadcasting devices with respect to each other.

According to a further embodiment of the invention, a computer program or computer program product is provided, e.g., in the form of a non-transitory storage medium, which comprises program code to be executed by at least one processor of a broadcasting device. Execution of the program code causes the broadcasting device to receive at least one wake-up packet for activating the broadcasting device from a WLAN access point. Further, execution of the program code causes the broadcasting device to send, in response to the at least one wake-up packet, a response comprising an identifier of the broadcasting device. The at least one wake-up packet coordinates the sending of the response by the broadcasting device with respect to sending of responses to the at least one wake-up packet by one or more other broadcasting devices.

Details of such embodiments and further embodiments will be apparent from the following detailed description of embodiments.

DETAILED DESCRIPTION OF EMBODIMENTS

In the following, concepts in accordance with exemplary embodiments of the invention will be explained in more detail and with reference to the accompanying drawings. The illustrated embodiments relate to controlling of WLAN based broadcasting devices. The broadcasting devices may for example correspond to tags for tracking goods or other objects, in the following also referred to as tracking tags. However, it is noted that the illustrated concepts could also be applied to other types of broadcasting devices, e.g., to sensor devices. As used herein, a broadcasting device denotes a WLAN device which sends transmissions in a broadcast mode to be receivable by any compatible WLAN access point within range of the broadcasting device and does not need to associate to a WLAN access point in order to communicate with it. The transmissions by the broadcasting devices may in particular be based on an eBCS technology.

In the illustrated examples, it is assumed that the broadcasting devices are activated by one or more wake-up packets (WUPs) from one or more WLAN access points, and then send a message in response to the WUP. This message, herein also denoted as response, includes an ID (identifier) of the broadcasting device sending the response. In some scenarios, the response could also include other data, e.g., sensor data measured by the broadcasting device. The WUPs are further used to coordinate the sending of the responses by multiple broadcasting devices with respect to each other. This coordination may allow for reducing or avoiding collisions of the responses. Accordingly, the risk of collisions of the responses may be reduced, even if the broadcasting devices are not capable of performing an LBT procedure before sending the response.

Figure 1:
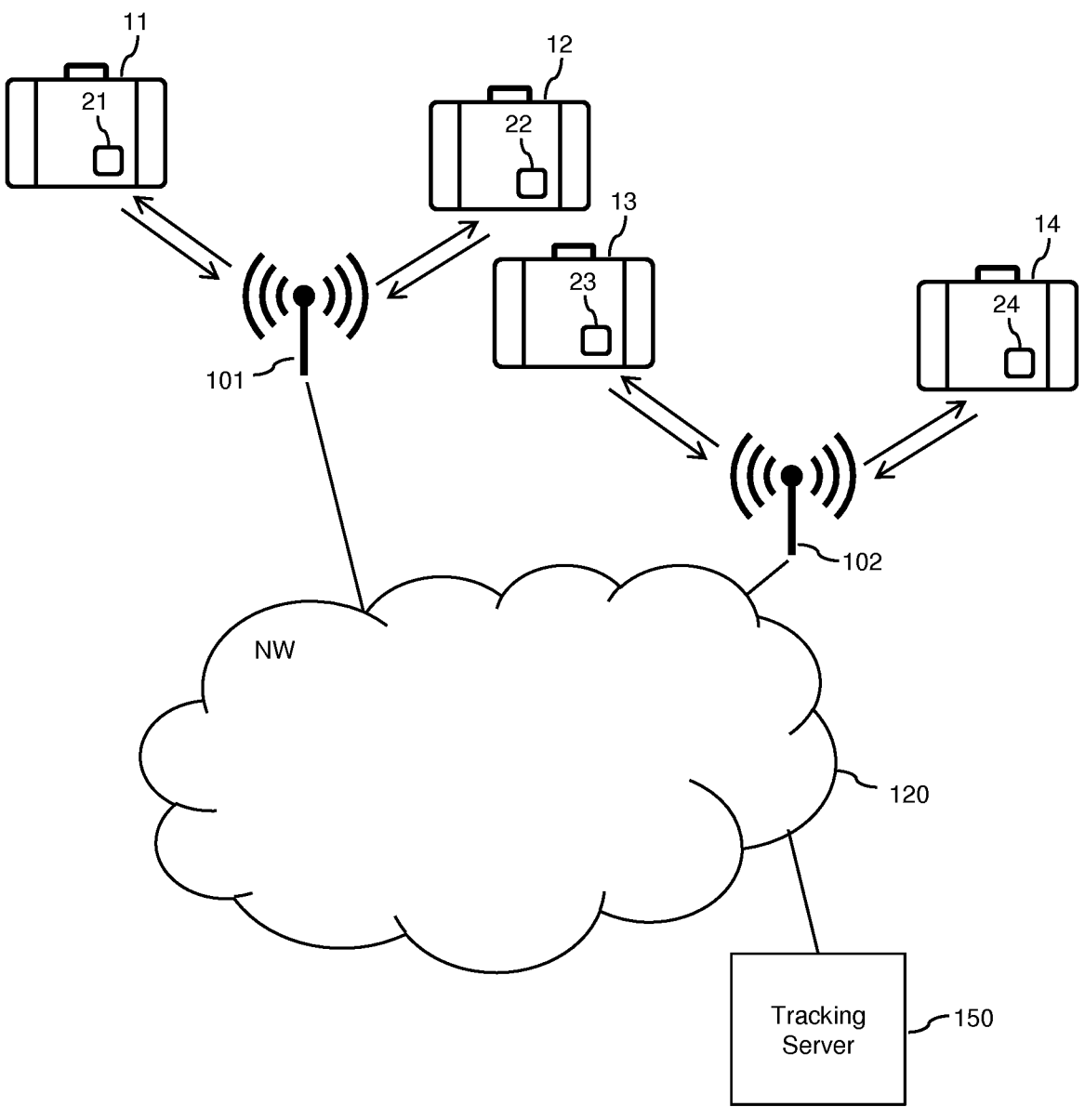
FIG. 1 schematically illustrates an exemplary system in which broadcasting devices are controlled according to an embodiment of the invention.

FIG. 1 illustrates an exemplary scenario, in which broadcasting devices 21, 22, 23, 24 are used for tracking objects 11, 12, 13, 14. In the example of FIG. 1, the objects 11, 12, 13, 14 are assumed to be luggage items, e.g., suitcases or bags. However, it is noted that the illustrated concepts could also be applied to other types of objects, e.g., to goods in shipment or production, vehicles, animals, or the like. The broadcasting devices 21, 22, 23, 24 correspond to tracking tags which are permanently or removably attached to the corresponding object 11, 12, 13, 14. Specifically, the tracking tag 21 is attached to the object 11, the tracking tag 22 is attached to the object 12, the tracking tag 23 is attached to the object 13, and the tracking tag 24 is attached to the object 14. Since the tracking tags 21, 22, 23, 24 are attached to the corresponding object 11, 12, 13, 14, detecting the location of a tracking tag 21, 22, 23, 24 also allows for determining or at least estimating the location of the corresponding object 11, 12, 13, 14.

In the scenario of FIG. 1, WLAN access points 101, 102 regularly send WUPs which are receivable by the tracking tags 21, 22, 23, 24 in the vicinity of the WLAN access point 101. Here, the tracking tag 21, 22, 23, 24 being in the vicinity of the access point 101, 102 means that the tracking tag 21, 22, 23, 24 which are sufficiently close to the WLAN access point 101, 102 to receive the WUP sent by the WLAN access point 101, 102. Reception of the WUP by the tracking tag 21, 22, 23, 24 triggers sending of a response by the tracking tag 21, 22, 23, 24. The response includes an ID of the tracking tag. In some scenarios, the response may also include other data, e.g., sensor data measured by the tracking tag 21, 22, 23, 24 or information on the object to which the tracking tag is attached. In FIG. 1, the WUPs and the responses are illustrated by arrows between the WLAN access points 101, 102 and the tracking tags 21, 22, 23, 24. As further illustrated, the WLAN access points 101, 102 are connected via a network (NW) to a tracking server 150. The network may include one or more public networks and/or one or more private networks. The access points 101, 102 provide data derived from the responses of the tracking tags 21, 22, 23, 24 to the tracking server 150. For example, the WLAN access points 101, 102 may add metadata to the responses from the tracking tags 21, 22, 23, 24 and then provide the responses with the metadata to the tracking server 150. The metadata may for example include a location of the WLAN access point 101, 102 that received the response and/or a time of receiving the response. This information may be used for estimating the location of the tracking tag 21, 22, 23, 24 at the given time.

In addition to trigger the sending of the response by the tracking tags 21, 22, 23, 24, the WUPs further coordinate the sending of the responses among the tracking tags 21, 22, 23, 24. As will be further explained in the following, this may be achieved by including coordination information into the WUPs and/or by controlling transmit power of the WUPs.

Figure 2:
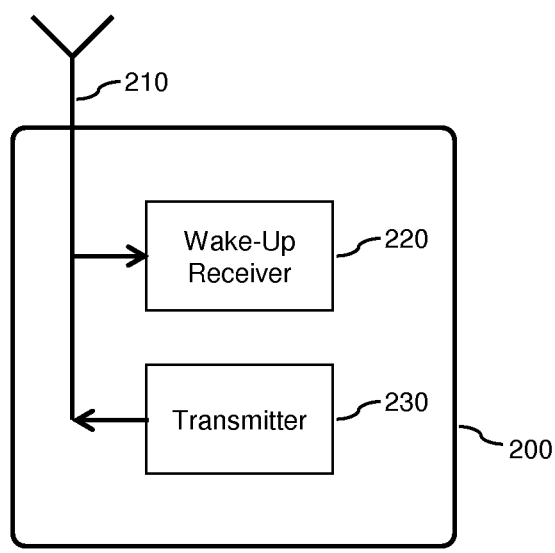
FIG. 2 schematically illustrates a broadcasting device according to an embodiment of the invention.

FIG. 2 schematically illustrates a broadcasting device 200 as used in the illustrated concepts. The broadcasting device 200 may for example correspond to any one of the tracking tags 21, 22, 23, 24 of FIG. 1.

As illustrated, the broadcasting device 200 is equipped with an antenna 210, a wake-up receiver (WURx) 220, and a primary connectivity radio (PCR) transmitter 230. WLAN transmission modes supported by the PCR transmitter 230 may include 802.11a, 802.11g, 802.11n, 802.11ac, and/or 802.11ax modes. The WURx 220 may in turn supporting only a 802.11ba mode. Capabilities of the WURx 220 may thus be limited as compared to the PCR transmitter 220. The limitation of capabilities of the WURx 220 may enable a low cost and power efficient implementation of the broadcasting device 200. On the other hand, the limitation of capabilities may have the effect that the broadcasting device 200 is not capable of performing an LBT procedure before sending its response to the WUP. In the illustrated concepts, collisions of responses from different broadcasting devices may nonetheless be avoided or reduced by using the WUPs to coordinate the process of sending the responses by the different broadcasting devices. As a result, the WUPs received by the broadcasting device 200 will cause the broadcasting device 200 to send its response using other resources than another broadcasting device, e.g., at another time and/or using another frequency channel.

Figure 3:
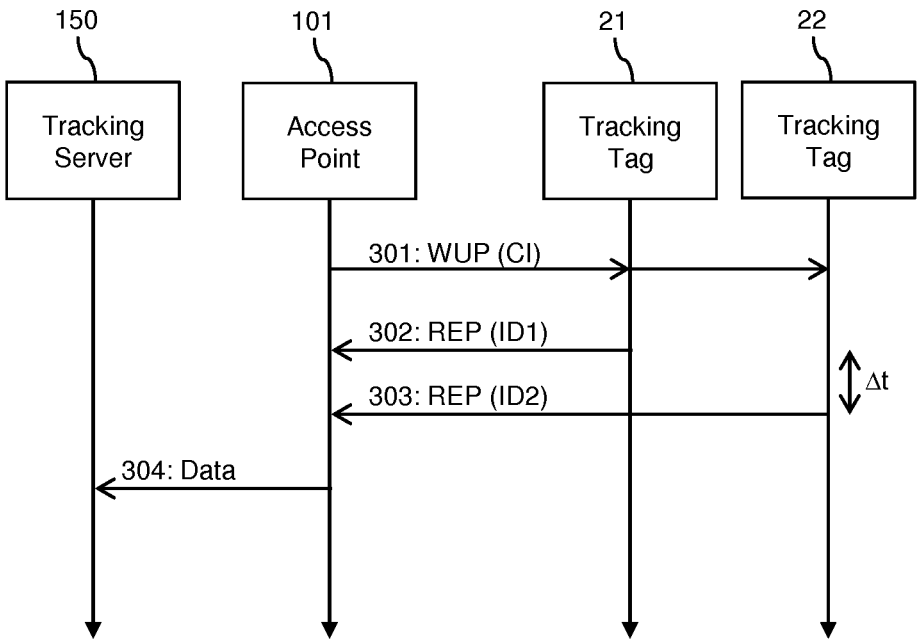
FIG. 3 schematically illustrates an example of processes in which broadcasting devices are controlled according to an embodiment of the invention.

FIG. 3 shows an example of processes which are based on the concepts as outlined above. The processes of FIG. 3 involve the WLAN access point 101, the tracking tag 21, the tracking tag 22, and the tracking server 150. It is noted that similar processes could also be performed in a constellation including the WLAN access point 102, the tracking tag 23, the tracking tag 24, or in constellations including more WLAN access points and/or tracking tags.

In the example of FIG. 3, the WLAN access point 101 sends a WUP 301. The WUP 301 is received by the tracking tag 21 and by the tracking tag 22. The WUP 301 includes control information (CI) for coordinating the sending of the responses by the tracking tags 21, 22.

In response to the WUP 301, the tracking tag 21 sends a first response 302, which includes the ID of the tracking tag 21, denoted as ID1, and the tracking tag 22 sends a second response 303, which includes the ID of the tracking tag 22, denoted as ID2. The coordination information in the WUP 301 causes the tracking tag 21 and the tracking tag 22 to send their respective responses at different times, as illustrated by a time offset Δt. The coordination information in the WUP 301 may control the individual timing of the responses 302, 303 by indicating a time value which depends on tracking tag specific information, e.g., on the ID of the tracking tag 21, 22. That is to say, the coordination information in the WUP 301 may instruct the tracking tags 21, 22 to send their respective response 302, 303 at a time to be individually determined by the tracking tag 21, 22 depending on the ID of the tracking tag 21, 22 and/or on other tracking tag specific information. In addition or as an alternative, the coordination information in the WUP 301 may instruct the tracking tags 21, 22 to send their respective response 302, 303 after a random time offset.

As further illustrated, the WLAN access point 101 receives the responses 302, 303 from the tracking tags 21, 22 and then sends data 304 derived from the responses 302, 303 to the tracking server 150. The data 304 may for example include the responses 302, 303 from the tracking tags 21, 22 and metadata indicating the location of the WLAN access point 101 when receiving the response 302, 303 and/or the time of receiving the response 302, 303.

It is noted that in the processes of FIG. 3 the coordination information in the WUP 301 could additionally or alternatively also be used to individually control the frequency channel on which the tracking tags 21, 22 send their respective response 302, 303. For example, the coordination information in the WUP 301 may control the individual frequency channel used for the responses 302, 303 by indicating a channel identifier which depends on tracking tag specific information, e.g., on the ID of the tracking tag 21, 22. That is to say, the coordination information in the WUP 301 may instruct the tracking tags 21, 22 to send their respective response 302, 303 on a frequency channel to be individually determined by the tracking tag 21, 22 depending on the ID of the tracking tag 21, 22 and/or on other tracking tag specific information. In addition or as an alternative, the coordination information in the WUP 301 may instruct the tracking tags 21, 22 to send their respective response 302, 303 on a randomly selected frequency channel.

Figure 4:
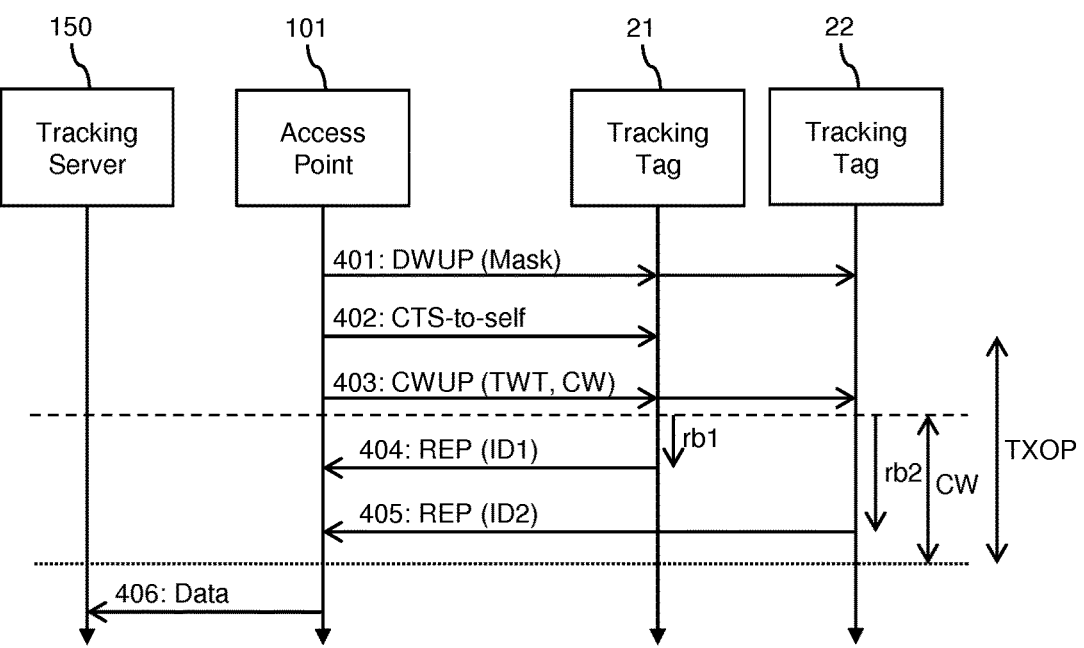
FIG. 4 schematically illustrates a further example of processes in which broadcasting devices are controlled according to an embodiment of the invention.

FIG. 4 shows a further example of processes which are based on the concepts as outlined above. The processes of FIG. 4 involve the WLAN access point 101, the tracking tag 21, the tracking tag 22, and the tracking server 150. It is noted that similar processes could also be performed in a constellation including the WLAN access point 102, the tracking tag 23, the tracking tag 24, or in constellations including more WLAN access points and/or tracking tags.

In the example of FIG. 4, the WLAN access point 101 sends a first WUP 401, referred to as DWUP (Discovery WUP). The first WUP 401 includes a data mask, e.g., a binary sequence, with the same length as used for representing the IDs of the tracking tags 21, 22. The first WUP 401 is received by the tracking device 21 and the tracking device 22. The data mask has the purpose of selecting certain tracking tags 21, 22 as being allowed to send a response. For example, upon reception of the first WUP 401, the tracking device 21, 22 may combine its ID with the data mask by using an XOR operation. If the result is 0, the tracking tag 21, 22 is allowed to transmit. Otherwise, it is not allowed to transmit. In the example of FIG. 4, it is assumed that both the tracking tag 21 and the tracking tag 22 determine from the first WUP 401 that they are allowed to send a response. Other tracking tags could however determine that they are not allowed to send a response. The first WUP 401 may thus be used to select a subset of the tracking tags which are within communication range of the WLAN access point 101, i.e., which can receive the first WUP 401. Since the WLAN access point 101 is typically not aware of the tracking tags within communication range of the WLAN access point 101, the selection of the subset of tracking tags is random from the perspective of the WLAN access point 101. By means of the data mask, the WLAN access point 101 can control the maximum number of tracking tags that are allowed to transmit in response to the WUP 401.

Further, the first WUP 401 allows the selected tracking tags, in the illustrated example the tracking tags 21, 22, to prepare the sending of the response. The tracking tags 21, 22 may remain in a low-power state until reception of the first WUP 401. Upon reception of the first WUP 401, the selected tracking tags may switch to a higher power state, e.g., by activating circuitry for acquiring a frequency synchronization to be used when sending the response.

In the example of FIG. 4, the WLAN access point 101 further performs carrier sensing and sends a CTS-to-self message 402. In this way, the WLAN access point 101 may acquires a TXOP (transmission opportunity). During the TXOP, other WLAN stations in the vicinity of the WLAN access point 101, e.g., the WLAN access point 102, will refrain from transmitting on the same carrier, thereby protecting the further communication of the WLAN access point 101 and the selected tracking tags 21, 22 from collisions with transmissions by such other WLAN stations.

The WLAN access point 101 then sends a second WUP 403, referred to as CWUP (Control WUP). The second WUP 403 includes coordination information in the form of a TWT (Target Wake Time) and a CW (Contention Window). These parameters have the purpose of controlling a response 404 by the tracking tag 21 and a response 405 tracking tag 22 to be sent within the TXOP. Accordingly, also the responses 404, 405 are protected from collisions with transmissions from the other WLAN stations in the vicinity of the WLAN access point 101. Further, CW may be used by the WLAN access point 101 to control probability of collisions among the responses 404, 405.

In the example of FIG. 4, it is further assumed that the tracking tag 21, 22 receiving the second WUP 403 generates a random number N between 0 and CW, which determines, in terms of a number of time slots, a random backoff to be applied before sending a response. As usual in 802.11 WLAN technologies, a time slot can be 9 μs. Further, the tracking tag 21, 22 waits until a time indicated by TWT before starting the random backoff. Until the time indicated by the TWT, the tracking tag 21, 22 may return to the low-power state. Upon expiry of the random backoff the tracking tag 21, 22 sends its respective response including the ID of the tracking tag 21, 22. In the example of FIG. 4, the tracking tag 21 sends its response 404 after a random backoff rb1, and the tracking tag 22 sends its response 405 after a longer random backoff rb2. Accordingly, the responses 404, 405 are sent at different times.

In a variant of the processes of FIG. 4, the first WUP 401 and the second WUP 403 could be combined into a single WUP, with the CTS-to-send 402 being sent before this combined WUP, after the combined WUP, or being omitted. Further, the processes of FIG. 4 could also be modified by keeping the first WUP 401 and the second WUP 403 as separate messages, but omitting the CTS-to-send.

As further illustrated, the WLAN access point 101 receives the responses 404, 405 from the tracking tags 21, 22 and then sends data 406 derived from the responses 404, 405 to the tracking server 150. The data 406 may for example include the responses 404, 405 from the tracking tags 21, 22 and metadata indicating the location of the WLAN access point 101 when receiving the response 404, 405 and/or the time of receiving the response 404, 405.

Figure 5:
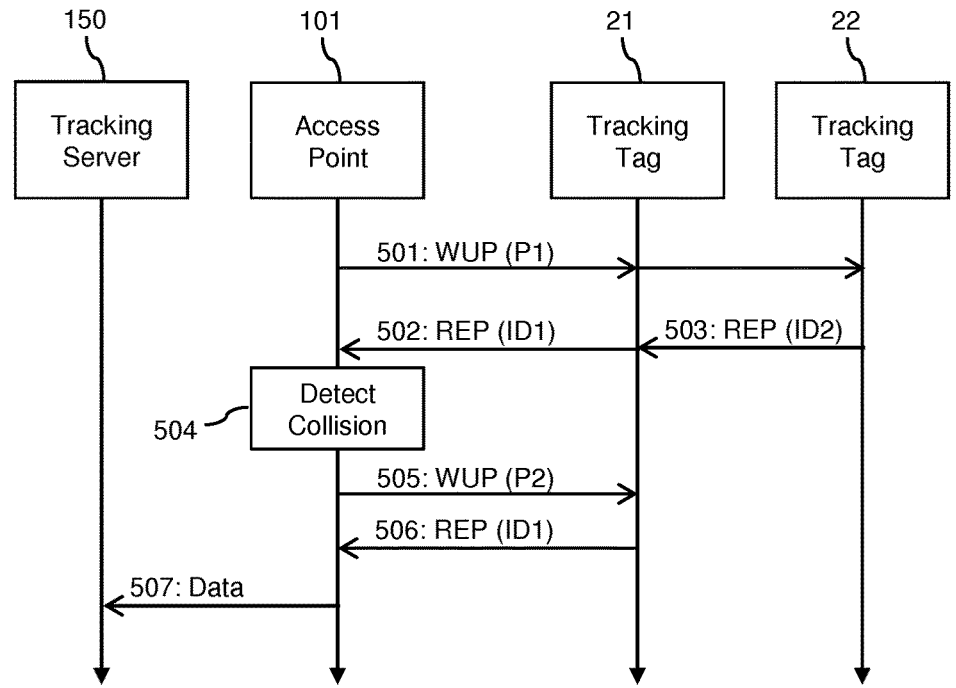
FIG. 5 schematically illustrates a further example of processes in which broadcasting devices are controlled according to an embodiment of the invention.

FIG. 5 shows a further example of processes which are based on the concepts as outlined above. The processes of FIG. 5 involve the WLAN access point 101, the tracking tag 21, the tracking tag 22, and the tracking server 150. It is noted that similar processes could also be performed in a constellation including the WLAN access point 102, the tracking tag 23, the tracking tag 24, or in constellations including more WLAN access points and/or tracking tags.

In the example of FIG. 5, the WLAN access point 101 sends a first WUP 501, using a first transmit power P1. The first WUP 501 is received by the tracking tag 21 and by the tracking tag 22.

In response to the first WUP 501, the tracking tag 21 sends a first response 502, which includes the ID of the tracking tag 21, denoted as ID1, and the tracking tag 22 sends a second response 503, which includes the ID of the tracking tag 22, denoted as ID2. In the illustrated example, the first response 502 and the second response 503 are assumed to be transmitted at the same time and on the same frequency channel, resulting in a collision.

As further illustrated by block 504, the WLAN access point 101 detects the collision. For example, the WLAN access point 101 may identify that a collision occurred by detecting signals which are not decodable. In response to detecting the collision, the WLAN access point 101 sends a second WUP 505, using a second transmit power P2 which is lower than the first transmit power P1. The second WUP 505 is received by the tracking tag 21, but not by the tracking tag 22, because at the lower second transmit power P2, the second tracking tag 22 is outside the communication range of the WLAN access point 101. In response to the second WUP 505, the tracking tag 21 then sends a further response 506 including the ID of the tracking tag 22. Since the tracking tag 22 does not transmit in response to the second WUP 505, the further response 506 is not affected by a collision and can be successfully received by the WLAN access point 101.

As further illustrated, the WLAN access point 101 then sends data 507 derived from the response 506 to the tracking server 150. The data 507 may for example include the response 506 from the tracking tag 21 and metadata indicating the location of the WLAN access point 101 when receiving the response 506 and/or the time of receiving the response 506.

Figure 6:
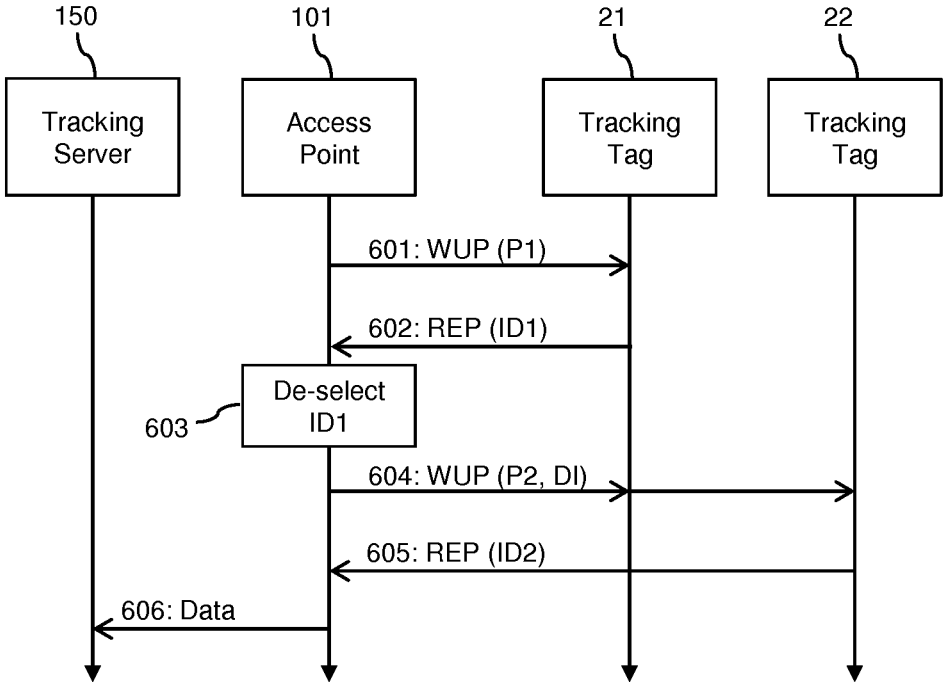
FIG. 6 schematically illustrates a further example of processes in which broadcasting devices are controlled according to an embodiment of the invention.

FIG. 6 shows a further example of processes which are based on the concepts as outlined above. The processes of FIG. 6 involve the WLAN access point 101, the tracking tag 21, the tracking tag 22, and the tracking server 150. It is noted that similar processes could also be performed in a constellation including the WLAN access point 102, the tracking tag 23, the tracking tag 24, or in constellations including more WLAN access points and/or tracking tags.

In the example of FIG. 6, the WLAN access point 101 sends a first WUP 601, using a first transmit power P1. The first WUP 501 is received by the tracking tag 21, but not by the tracking tag 22, because at the first transmit power P1 the second tracking tag 22 is outside the communication range of the WLAN access point 101.

In response to the first WUP 601, the tracking tag 21 sends a first response 602, which includes the ID of the tracking tag 21, denoted as ID1. Since the tracking tag 22 does not transmit in response to the first WUP 501, the first response 602 is not affected by a collision and can be successfully received by the WLAN access point 101.

As indicated by block 603, in response to receiving the first response 602 with the ID of the tracking tag 21, the WLAN access point 101 de-selects the tracking tag 21, i.e., decides that at least temporarily the tracking tag 21 is no longer allowed to transmit in response to a WUP from the WLAN access point 101.

The WLAN access point 101 sends a second WUP 604, using a second transmit power P2 which is higher than the first transmit power P1. The second WUP 604 further includes de-selection information (DI) indicating the de-selection of the tracking tag 21. The de-selection information may for example be based on the ID of the tracking tag 21, include the ID or information derived from the ID. Due to the higher second transmit power P2, the second WUP 604 is received by the tracking tag 21 and by the tracking tag 22. In response to the second WUP 604, the tracking tag 22 then sends a second response 605 including the ID of the tracking tag 22, denoted as ID2. The tracking device 21, in turn, determines from the de-selection information in the second WUP 604 that it is not allowed to transmit in response to the second WUP 604 and thus refrains from sending another response. Since the tracking tag 21 does not transmit in response to the second WUP 604, the second response 605 is not affected by a collision and can be successfully received by the WLAN access point 101.

As further illustrated, the WLAN access point 101 then sends data 606 derived from the responses 602, 605 to the tracking server 150. The data 606 may for example include the responses 602, 605 from the tracking tags 21, 22 and metadata indicating the location of the WLAN access point 101 when receiving the response 602, 605 and/or the time of receiving the response 602, 605.

In the examples of FIGS. 5 and 6, the used transmit power may be based on knowledge of the deployment of WLAN access points, e.g., the location of the WLAN access point 101 relative to the WLAN access point 102. By suitably selecting the transmit power, it can be taken into account that in typical scenarios multiple WLAN access points are within the communication range of a certain tracking tag, so that the tracking tags 21, 22, 23, 24 could receive multiple WUPs from different WLAN access points, resulting in excessive response transmissions. This may be counteracted by setting the transmit power such that a certain tracking tag 21, 22, 23, 24 will be within the communication range of preferably not more than one WLAN access point 101, 102.

In processes like in the example of FIG. 6, the WLAN access point may cycle the transmit power of the WUPs by starting at a configured low transmit power, in order to limit the number of the tracking tags that receive the initial WUP. The transmit power may then be increased in steps, so that the next WUPs reach more and more tracking tags. Once an ID of a tracking tag is received by the WLAN access point, the tracking tag is de-selected and not allowed to transmit in response to the next WUPs. In this way, it can be achieved that a tracking tag does not respond more times than necessary.

In some scenarios, the tracking times may also have a timer that is reset each time they send a response and may be allowed to send a response only after the timer has expired. If progressively increasing the transmit power of WUPs like in the processes of FIG. 6, tracking tags with different path loss are allowed to transmit in response to each WUP. Once a configured maximum transmit power is reached, the WLAN access point may restart the transmit power cycle at the configured low transmit power.

Figure 7:
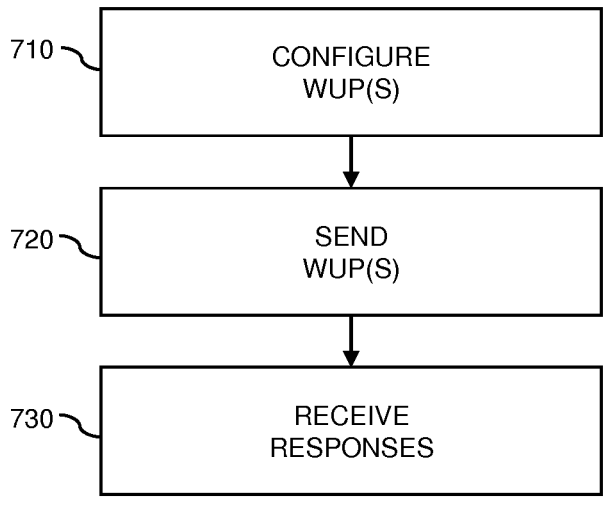
FIG. 7 shows a flowchart for illustrating a method according to an embodiment of the invention.

FIG. 7 shows a flowchart for illustrating a method, which may be utilized for implementing the illustrated concepts. The method of FIG. 7 may be used for implementing the illustrated concepts in a WLAN access point, e.g., the above-mentioned WLAN access point 101 or 102.

If a processor-based implementation of the WLAN access point is used, at least some of the steps of the method of FIG. 7 may be performed and/or controlled by one or more processors of the WLAN access point. Such WLAN access point may also include a memory storing program code for implementing at least some of the below described functionalities or steps of the method of FIG. 7.

At step 710, the WLAN access point may configure at least one WUP. The at least one WUP has the purpose of activating broadcasting devices in vicinity of the WLAN access point, such as the above-mentioned tracking tags 21, 22, 23, 24 or the broadcasting device 200. Further, the at least one WUP has the purpose of coordinating responses from the broadcasting devices with respect to each other. In particular, the responses may be coordinated to be sent on different radio resources, e.g., in different time slots and/or on different frequency channels. The configuration of step 710 may for example involve determining content of the at least one WUP or setting transmit power for sending the WUP.

The broadcasting devices may correspond to tracking tags, e.g., like the above-mentioned tracking tags 21, 22, 23, 24. However, other types of broadcasting devices could be used as well, e.g., sensor devices, various types of IoT devices, vehicle-mounted devices, or vehicle-integrated devices. In some scenarios, e.g., if the broadcasting devices correspond to tracking devices, each broadcasting device may be permanently or removably attached to an object to be tracked, e.g., to a suitcase, bag or other luggage item, to a transport container, to a vehicle, such as a passenger car, a bus, a truck, a bicycle, a motorcycle, an electric scooter, an aircraft, a watercraft, a train or train car, or the like, or to an animal. The broadcasting devices may correspond to low-complexity or low-power devices with limited receiver capabilities. In particular, the broadcasting devices may lack a capability to perform an LBT procedure for before sending the response to the WUP.

At step 720, the WLAN access point sends the at least one WUP. The at least one WUP may be conveyed in a WLAN message, e.g., based on an 801.11ba transmission mode. The above-mentioned WUPs 301, 401, 403, 501, 505, 601, and 604 are examples of the at least one WUP. In some scenarios, the WLAN access point may also send multiple WUPs. FIGS. 4, 5, and 6 illustrate examples of such scenarios.

In some scenarios, the at least one WUP indicates information for controlling the sending of the response by the respective broadcasting device. The above-mentioned coordination information in the WUP 301, the data mask in the WUP 401, the TWT and CW in the WUP 403, and the de-selection information in the WUP 604 are examples of such information.

In some scenarios, the at least one WUP indicates a frequency channel to be used sending of the response by the respective broadcasting device, e.g., like explained for the WUP 301.

In some scenarios, the at least one WUP includes selection information enabling the broadcasting device to determine whether it is allowed to send the response. The data mask in the WUP 401 and the de-selection information in the WUP 604 are examples of such information. Accordingly, the selection information may also include a data mask to be combined with an identifier of the broadcasting device or with other broadcasting device specific information.

In some scenarios, the at least one WUP includes timing information for controlling a timing of sending the response. The above-mentioned coordination information in the WUP 301 and the TWT and CW in the WUP 403 are examples of such timing information. In some examples, the timing information may include a target time after which the broadcasting device is allowed to send the response, e.g., like explained for the TWT indicated by the WUP 403. In some example, the timing information may also include a contention window for controlling a random backoff applied by the broadcasting device before sending the response, e.g., like explained for the CW indicated by the WUP 403.

In some scenarios, if the WLAN access point sends multiple WUPs, the access point may send the multiple WUPs with different transmit power to coordinate the sending of the responses by the broadcasting devices. FIGS. 5 and 6 illustrate examples of such scenarios.

For example, using a first transmit power, the WLAN access point may send a first WUP. In response to detecting a congestion of a channel used by the broadcasting devices for sending the responses, the WLAN access point may send a second WUP, using a second transmit power that is lower than the first transmit power. FIG. 5 illustrates an example of corresponding processes.

At step 730, WLAN access point receives responses to the at least one WUP from the broadcasting devices. The responses may be conveyed in WLAN messages, e.g., based on an 802.11a, 802.11g, 802.11n, 802.11ac, or 802.11ax transmission modes. In some scenarios, the responses from different broadcasting devices may also be based on different transmission modes. Each response comprises an identifier of the broadcasting device sending the response. The sending of the responses by the broadcasting devices is coordinated by the at least one WUP sent at step 720.

It is noted that in some scenarios, where the WLAN access point sends multiple WUPs, the sending of the WUPs according to step 720 and the receiving of the responses according to step 730 may be interleaved.

For example, the WLAN access point may send a first WUP and receive one or more responses from the broadcasting devices in response to the first WUP. Each response may then include an identifier of the broadcasting device sending the response. The WLAN access point may then de-select one or more broadcasting devices corresponding to one or more identifiers received in the one or more responses from the broadcasting devices. Then the access point may send a second WUP for activating broadcasting devices, with the second WUP identifying the de-selected broadcasting devices and indicating that the de-selected broadcasting devices are not allowed to send a response to the second WUP. In such cases, the second WUP could be sent with a lower transmit power than the first WUP. FIG. 6 illustrates an example of corresponding processes.

Figure 8:
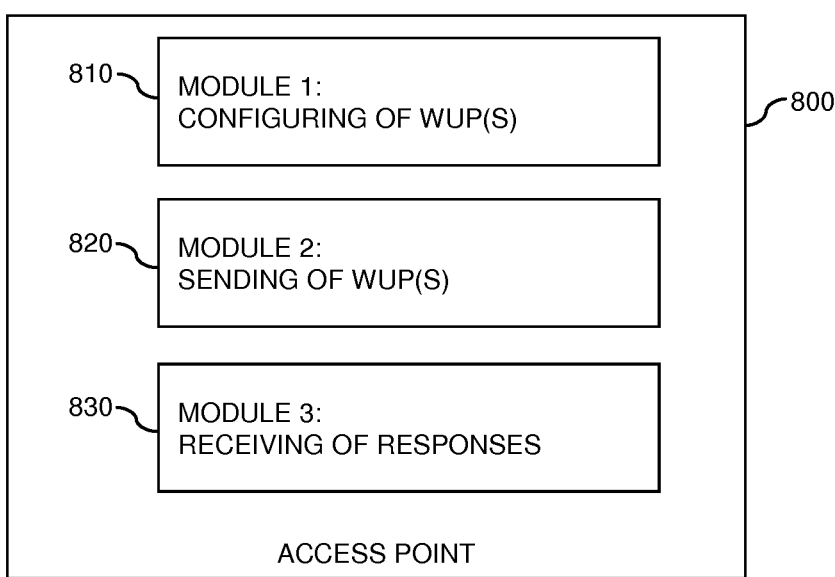
FIG. 8 shows an exemplary block diagram for illustrating functionalities of an access point implementing functionalities corresponding to the method of FIG. 7.

FIG. 8 shows a block diagram for illustrating functionalities of a WLAN access point 800 which operates according to the method of FIG. 7. The WLAN access point 800 may for example correspond to any of the above-mentioned WLAN access points 101, 102. As illustrated, the WLAN access point 800 may be provided with a module 810 configured to configure at least one WUP, such as explained in connection with step 710. Further, the WLAN access point 800 may be provided with a module 820 configured to send the at least one WUP, such as explained in connection with step 720. Further, the WLAN access point 800 may be provided with a module 830 configured to receive responses with identifiers of broadcasting devices, such as explained in connection with step 730.

It is noted that the WLAN access point 800 may include further modules for implementing other functionalities, such as known functionalities of a WLAN access point. Further, it is noted that the modules of the WLAN access point 800 do not necessarily represent a hardware structure of the WLAN access point 800, but may also correspond to functional elements, e.g., implemented by hardware, software, or a combination thereof.

Figure 9:
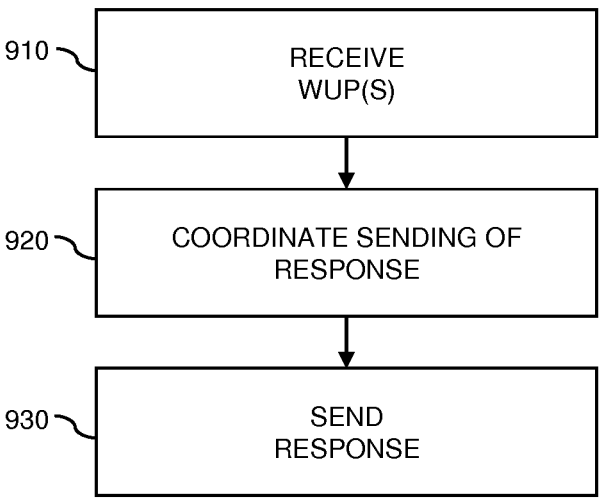
FIG. 9 shows a flowchart for illustrating a further method according to an embodiment of the invention.

FIG. 9 shows a flowchart for illustrating a further method, which may be utilized for implementing the illustrated concepts. The method of FIG. 9 may be used for implementing the illustrated concepts in a broadcasting device, e.g., one of the above-mentioned tracking tags 21, 22, 23, 24 or the broadcasting device 200.

The broadcasting device may correspond to a tracking tag, e.g., like the above-mentioned tracking tags 21, 22, 23, 24. However, other types of broadcasting device could be used as well, e.g., a sensor device, various types of IoT device, a vehicle-mounted device, or vehicle-integrated device. In some scenarios, e.g., if the broadcasting device corresponds to a tracking device, the broadcasting device may be permanently or removably attached to an object to be tracked, e.g., to a suitcase, bag or other luggage item, to a transport container, to a vehicle, such as a passenger car, a bus, a truck, a bicycle, a motorcycle, an electric scooter, an aircraft, a watercraft, a train or train car, or the like, or to an animal. The broadcasting device may correspond to low-complexity or low-power devices with limited receiver capabilities. In particular, the broadcasting device may lack a capability to perform an LBT procedure for before sending the response to the WUP.

If a processor-based implementation of the broadcasting device is used, at least some of the steps of the method of FIG. 9 may be performed and/or controlled by one or more processors of the broadcasting device. Such broadcasting device may also include a memory storing program code for implementing at least some of the below described functionalities or steps of the method of FIG. 9.

At step 910, the broadcasting device receives at least one WUP from a WLAN access point, e.g., the above-mentioned WLAN access point 101 or 102. The at least one WUP has the purpose of activating broadcasting devices in vicinity of the WLAN access point. Further, the at least one WUP has the purpose of coordinating responses from the broadcasting devices with respect to each other. In particular, the responses may be coordinated to be sent on different radio resources, e.g., in different time slots and/or on different frequency channels.

The at least one WUP may be conveyed in a WLAN message, e.g., based on an 801.11ba transmission mode. The above-mentioned WUPs 301, 401, 403, 501, 505, 601, and 604 are examples of the at least one WUP. In some scenarios, the broadcasting device may also receive multiple WUPs. FIGS. 4, 5, and 6 illustrate examples of such scenarios.

In some scenarios, the at least one WUP indicates information for controlling the sending of the response by the broadcasting device. The above-mentioned coordination information in the WUP 301, the data mask in the WUP 401, the TWT and CW in the WUP 403, and the de-selection information in the WUP 604 are examples of such information.

In some scenarios, the at least one WUP indicates a frequency channel to be used sending of the response by the broadcasting device, e.g., like explained for the WUP 301.

In some scenarios, the at least one WUP includes selection information enabling the broadcasting device to determine whether it is allowed to send the response. The data mask in the WUP 401 and the de-selection information in the WUP 604 are examples of such information. Accordingly, the selection information may also include a data mask to be combined with an identifier of the broadcasting device or with other broadcasting device specific information.

In some scenarios, the at least one WUP includes timing information for controlling a timing of sending the response. The above-mentioned coordination information in the WUP 301 and the TWT and CW in the WUP 403 are examples of such timing information. In some examples, the timing information may include a target time after which the broadcasting device is allowed to send the response, e.g., like explained for the TWT indicated by the WUP 403. In some example, the timing information may also include a contention window for controlling a random backoff applied by the broadcasting device before sending the response, e.g., like explained for the CW indicated by the WUP 403.

In some scenarios, if the broadcasting device receives multiple WUPs, the multiple WUPs may have been sent with different transmit power to coordinate the sending of the responses by the broadcasting devices. FIGS. 5 and 6 illustrate examples of such scenarios.

At step 920, the broadcasting device coordinates sending of the response by the broadcasting device with respect to sending of responses to the at least one WUP by one or more other broadcasting devices. This coordination is based on the received at least one WUP, e.g., based on the coordination information included in the received at least one WUP and/or based on transmission parameters of the at least one WUP, such as transmit power.

At step 930, broadcasting device sends the response to the at least one WUP. The response may be conveyed in a WLAN message, e.g., based on an 802.11a, 802.11g, 802.11n, 802.11ac, or 802.11ax transmission mode. The response comprises an identifier of the broadcasting device.

The sending of the responses by the broadcasting device is based on the coordination of step 920.

In some scenarios, the broadcasting device may receive a first WUP and send a first response in response to the first WUP, the response including the identifier of the broadcasting device. The broadcasting device may then receive a second WUP, with the second WUP identifying the broadcasting device as being de-selected and indicating that the broadcasting device is not allowed to send a response to the second WUP. In such cases, the second WUP could be sent with a lower transmit power than the first WUP. FIG. 6 illustrates an example of corresponding processes.

Figure 10:
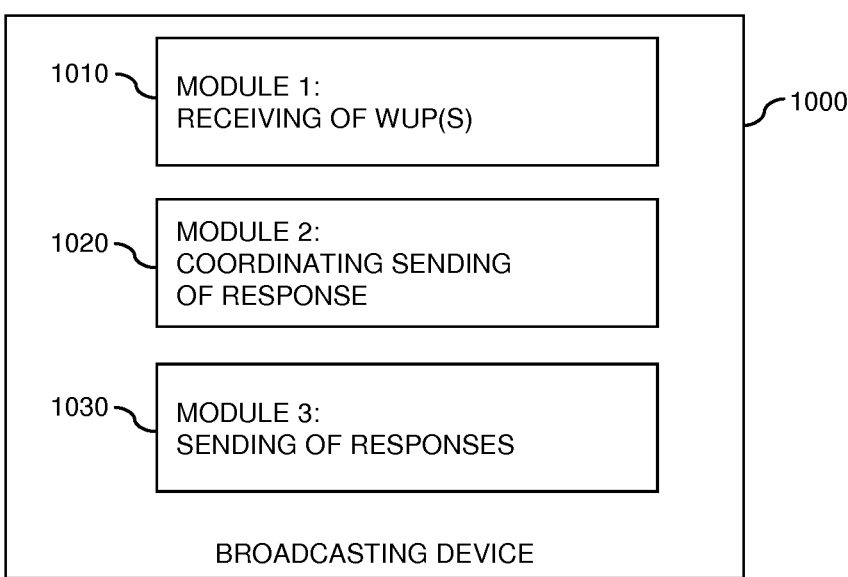
FIG. 10 shows an exemplary block diagram for illustrating functionalities of a broadcasting device implementing functionalities corresponding to the method of FIG. 9.

FIG. 10 shows a block diagram for illustrating functionalities of a broadcasting device 1000 which operates according to the method of FIG. 9. The broadcasting device 1000 may for example correspond to any of the above-mentioned devices 21, 22, 23, 24, or 200. As illustrated, the broadcasting device 1000 may be provided with a module 1010 configured to receive at least one WUP, such as explained in connection with step 910. Further, the broadcasting device 1000 may be provided with a module 1020 configured to coordinate sending of a response to the at least one WUP, such as explained in connection with step 920. Further, the broadcasting device 1000 may be provided with a module 1030 configured to send the response with the identifier of the broadcasting devices, such as explained in connection with step 930.

It is noted that the broadcasting device 1000 may include further modules for implementing other functionalities, such as known functionalities of a WLAN station. Further, it is noted that the modules of the broadcasting device 1000 do not necessarily represent a hardware structure of the broadcasting device 1000, but may also correspond to functional elements, e.g., implemented by hardware, software, or a combination thereof.

Figure 11:
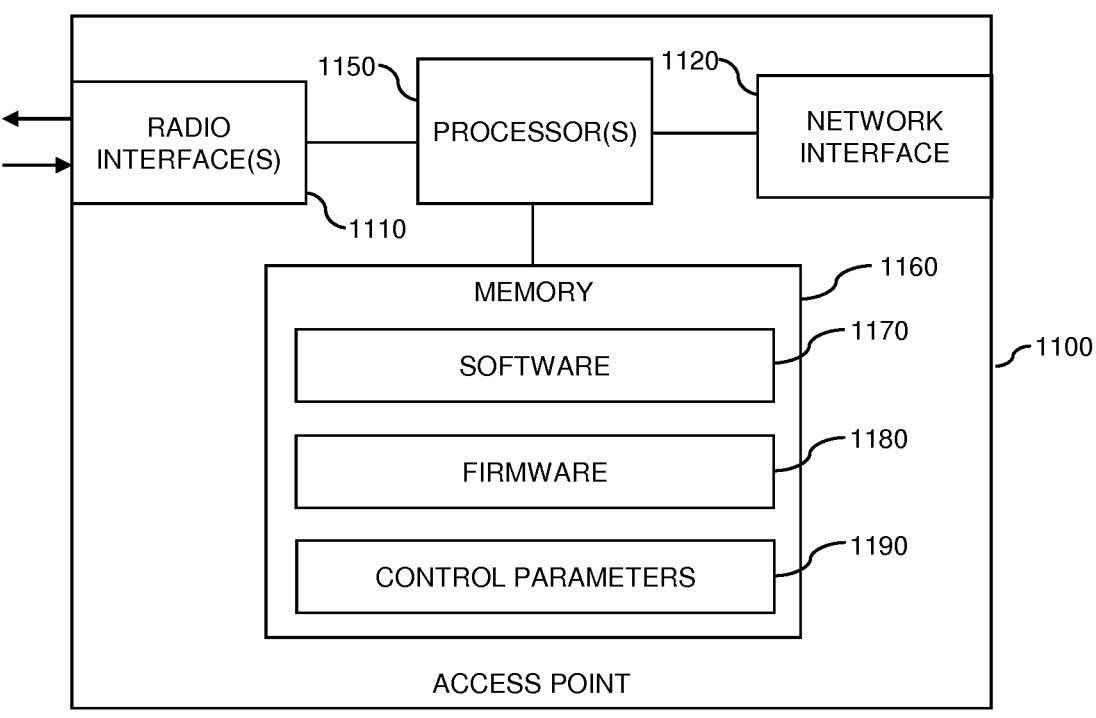
FIG. 11 schematically illustrates a processor-based implementation of an access point according to an embodiment of the invention.

FIG. 11 illustrates a processor-based implementation of a WLAN access point 1100 which may be used for implementing the above-described concepts. For example, the structures as illustrated in FIG. 11 may be used for implementing the concepts in the above-mentioned WLAN access point 101 or 102.

As illustrated, the WLAN access point 1100 includes one or more radio interfaces 1110. The radio interface(s) 1110 may for example be based on various WLAN technologies, e.g., according to 802.11a, 802.11g, 802.11n, 802.11ac, 802.11ax, and/or 801.11ba. Further, the WLAN access point 1100 may include a network interface 1120 for connecting to a network, e.g., such as the above-mentioned network 120. The network interface 1120 may be used for communicating data with a server, such as the above-mentioned tracking server 200.

Further, the WLAN access point 1100 may include one or more processors 1150 coupled to the interface(s) 1110, 1120 and a memory 1160 coupled to the processor(s) 1150. By way of example, the interface(s) 1110, 1120 the processor(s) 1150, and the memory 1160 could be coupled by one or more internal bus systems of the WLAN access point 1100. The memory 1160 may include a Read-Only-Memory (ROM), e.g., a flash ROM, a Random Access Memory (RAM), e.g., a Dynamic RAM (DRAM) or Static RAM (SRAM), a mass storage, e.g., a hard disk or solid state disk, or the like. As illustrated, the memory 1160 may include software 1170 and/or firmware 1180. The memory 1160 may include suitably configured program code to be executed by the processor(s) 1150 so as to implement the above-described functionalities of a WLAN access point, such as explained in connection with FIGS. 7 and 8.

It is to be understood that the structures as illustrated in FIG. 11 are merely schematic and that the WLAN access point 1100 may actually include further components which, for the sake of clarity, have not been illustrated, e.g., further interfaces or processors. Also, it is to be understood that the memory 1160 may include further program code for implementing known functionalities of a WLAN access point. According to some embodiments, also a computer program may be provided for implementing functionalities of the WLAN access point 1100, e.g., in the form of a physical medium storing the program code and/or other data to be stored in the memory 1160 or by making the program code available for download or by streaming.

Figure 12:
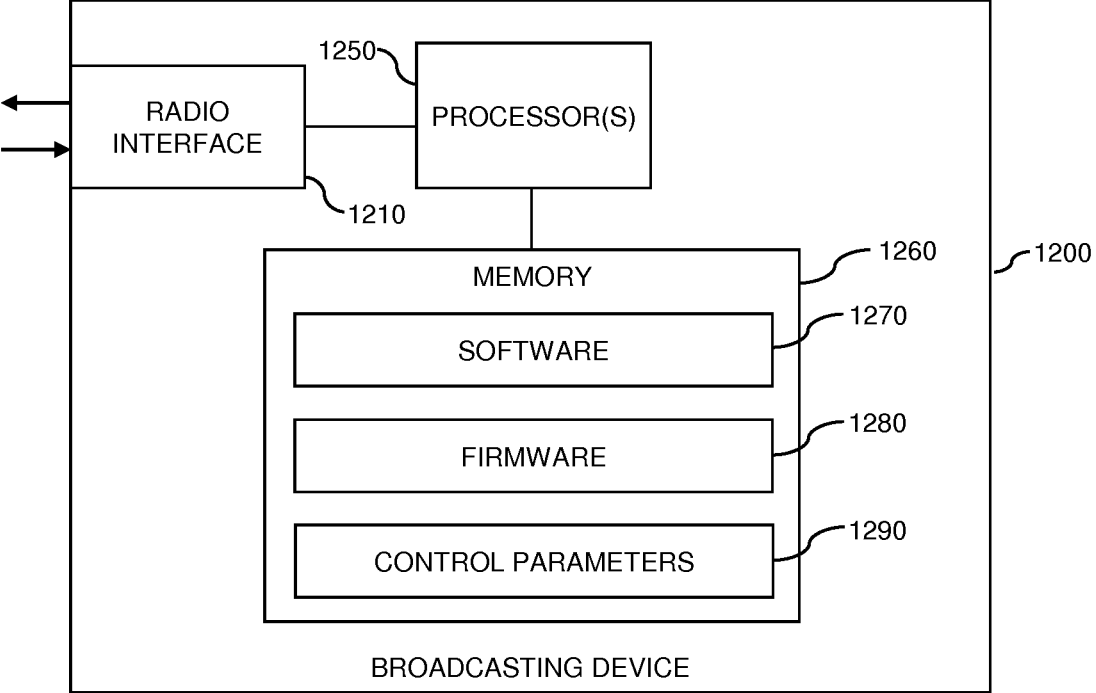
FIG. 12 schematically illustrates a processor-based implementation of a broadcasting device according to an embodiment of the invention.

FIG. 12 illustrates a processor-based implementation of a broadcasting device 1200 which may be used for implementing the above-described concepts. For example, the structures as illustrated in FIG. 12 may be used for implementing the concepts in any of the above-mentioned devices 21, 22, 23, 24, or 200.

As illustrated, the broadcasting device 1200 includes a radio interface 1210. The radio interface 1210 may for example be based on one or more WLAN technologies, e.g., according to 802.11a, 802.11g, 802.11n, 802.11ac, 802.11ax, and/or 801.11ba. The radio interface 1110 may be based on a WURx and a PCR transmitter using different WLAN transmission modes, e.g., as explained in connection with FIG. 2.

Further, the broadcasting device 1200 may include one or more processors 1250 coupled to the radio interface 1210 and a memory 1260 coupled to the processor(s) 1250. By way of example, the radio interface 1210, the processor(s) 1250, and the memory 1260 could be coupled by one or more internal bus systems of the broadcasting device 1200. The memory 1260 may include a ROM, e.g., a flash ROM, a RAM, e.g., a DRAM or SRAM, a mass storage, e.g., a hard disk or solid state disk, or the like. As illustrated, the memory 1260 may include software 1270 and/or firmware 1280. The memory 1260 may include suitably configured program code to be executed by the processor(s) 1250 so as to implement the above-described functionalities for controlling data traffic, such as explained in connection with FIGS. 9 and 10.

It is to be understood that the structures as illustrated in FIG. 12 are merely schematic and that the broadcasting device 1200 may actually include further components which, for the sake of clarity, have not been illustrated, e.g., one or more sensors and/or further interfaces or processors. Also, it is to be understood that the memory 1160 may include further program code for implementing known functionalities of a tracking tag or other WLAN based broadcasting device. According to some embodiments, also a computer program may be provided for implementing functionalities of the broadcasting device 1200, e.g., in the form of a physical medium storing the program code and/or other data to be stored in the memory 1260 or by making the program code available for download or by streaming.

As can be seen, the concepts as described above may be used for efficiently controlling broadcasting devices. In particular, collisions of transmissions by the broadcasting devices may be reduced or avoided, even if the broadcasting devices are not capable of performing an LBT procedure. This in turn allows for power efficient and cost efficient implementation of object tracking or other applications involving detection of messages from WLAN based broadcasting devices.

It is to be understood that the examples and embodiments as explained above are merely illustrative and susceptible to various modifications. For example, the illustrated concepts may be applied in connection with various kinds of WLAN technologies. Further, it is noted that the concepts could be applied in connection with other wireless communication technologies, e.g., a Bluetooth technology, an ad-hoc mode of a 3GPP ($3^{rd}$ Generation Partnership Project) network or other cellular communication technology or for unlicensed band operation of a 3GPP network or other cellular communication technology. In such cases, the above-mentioned functionalities of the WLAN access point could be implemented by a base station, an access node, or access point of the 3GPP network or of the other cellular network, i.e., in such cases the above-mentioned WLAN access point could correspond to some other type of access point or access node. Further, the concepts may be applied with respect to various types broadcasting devices, without limitation to tracking tags.

Moreover, it is to be understood that the above concepts may be implemented by using correspondingly designed software to be executed by one or more processors of an existing device or apparatus, or by using dedicated device hardware. Further, it should be noted that some of the illustrated apparatuses or devices, e.g., the access points or tracking server, may be implemented as a system of multiple interacting devices or modules, e.g. in a cloud system.

The invention claimed is:

1. A method of controlling broadcasting devices, the method comprising:

sending, from a wireless-local area network access point, a wake-up packet which is receivable by broadcasting devices in vicinity of the wireless-local area network access point and which has the purpose of activating a subset of the broadcasting devices, wherein the subset includes multiple broadcasting devices; and in response to the wake-up packet, receiving, by the wireless-local area network access point, responses from the broadcasting devices in the subset, each response comprising an identifier of the broadcasting device sending the response;

wherein the wake-up packet coordinates the sending of the responses by the broadcasting devices with respect to each other; and wherein the wake-up packet comprises a data mask configured to select the multiple broadcasting devices in the subset that are to send a response to the wake-up packet, wherein the data mask is to be combined, by an XOR operation, with an identifier of a broadcasting device for enabling the broadcasting device to determine whether the broadcasting device is allowed to send a response, wherein the data mask is a binary sequence of the same length as used for representing identifiers of the broadcasting devices, wherein the data mask has a value of one in one or more positions of the binary sequence, and wherein the subset of broadcasting devices includes any broadcasting devices whose identifiers have a value of one in those same one or more positions.

2. The method according to claim 1, wherein the wake-up packet indicates information for controlling the sending of a response by a respective broadcasting device.

3. The method according to claim 1, wherein the wake-up packet indicates a frequency channel to be used for sending of a response by a respective broadcasting device.

4. The method according to claim 1, wherein the wake-up packet comprises timing information for controlling a timing of sending of a response by a respective broadcasting device, wherein the timing information comprises a target time after which the broadcasting device is allowed to send the response or comprises a contention window for controlling a random backoff applied by the broadcasting device before sending the response.

5. The method according to claim 1, comprising sending, by the wireless-local area network access point, multiple wake-up packets for activating broadcasting devices in vicinity of the wireless-local area network access point, wherein the multiple wake-up packets are sent with different transmit powers to coordinate the sending of the responses by the broadcasting devices.

6. The method according to claim 5, comprising:

using a first transmit power, sending, by the wireless-local area network access point, a first wake-up packet for activating broadcasting devices in vicinity of the wireless-local area network access point;

in response to detecting a congestion of a channel used by the broadcasting devices for sending responses to the first wake-up packet, sending, by the wireless-local area network access point, using a second transmit power that is lower than the first transmit power, a second wake-up packet for activating broadcasting devices in vicinity of the wireless-local area network access point; and in response to the second wake-up packet, receiving, by the wireless-local area network access point, one or more responses from one or more of the broadcasting devices, each response comprising an identifier of the broadcasting device sending the response.

7. The method according to claim 1, comprising:

sending, by the wireless-local area network access point, a first wake-up packet for activating broadcasting devices in vicinity of the wireless-local area network access point;

in response to the first wake-up packet, receiving, by the wireless-local area network access point, one or more responses from one or more of the broadcasting devices, each response comprising an identifier of the broadcasting device sending the response;

de-selecting, by the wireless-local area network access point, one or more broadcasting devices corresponding to one or more identifiers received in the one or more responses;

sending, by the wireless-local area network access point, a second wake-up packet for activating broadcasting devices in vicinity of the wireless-local area network access point, the second wake-up packet identifying the one or more de-selected broadcasting devices and indicating that the one or more de-selected broadcasting devices are not allowed to send a response to the second wake-up packet.

8. The method according to claim 1, wherein the broadcasting devices do not support performing a listen-before-talk procedure for before sending the response.

9. A method of controlling a broadcasting device, the method comprising:

receiving, by the broadcasting device, a wake-up packet from a wireless-local area network access point, wherein the wake-up packet is receivable by broadcasting devices in vicinity of the wireless-local area network access point and has the purpose of activating a subset of the broadcasting devices, wherein the subset includes multiple broadcasting devices, wherein the wake-up packet coordinates the sending of the response by the broadcasting device with respect to sending of responses to the wake-up packet by the other broadcasting devices in the vicinity of the wireless-local area network access point, and wherein the wake-up packet comprises a data mask configured to select the multiple broadcasting devices in the subset that are to send a response to the wake-up packet, wherein the data mask is a binary sequence of the same length as used for representing respective identifiers of the broadcasting devices, wherein the data mask has a value of one in one or more positions of the binary sequence, and wherein the subset of broadcasting devices includes any broadcasting devices whose identifiers have a value of one in those same one or more positions;

determining whether the broadcasting device is allowed to send a response to the wake-up packet, by using an XOR operation to combine the data mask with the identifier of the broadcasting device; and based on determining that the broadcasting device is allowed to send a response to the wake-up packet, in response to the wake-up packet, sending, by the broadcasting device, a response comprising the identifier of the broadcasting device.

10. The method according to claim 9, wherein the wake-up packet indicates information for controlling the sending of the response by the broadcasting device.

11. The method according to claim 9, wherein the wake-up packet indicates a radio channel to be used for sending of the response by the broadcasting device.

12. The method according to claim 9, wherein the wake-up packet comprises timing information for controlling a timing of sending of the response by the broadcasting device, wherein the timing information comprises a target time after which the broadcasting device is allowed to send the response or comprises a contention window for controlling a random backoff applied by the broadcasting device before sending the response.

13. The method according to claim 9, comprising receiving, by the broadcasting device, multiple wake-up packets sent with different transmit powers.

14. The method according to claim 9, comprising:

receiving, by the broadcasting device, a first wake-up packet from the wireless-local area network access point;

in response to the first wake-up packet, sending, by the broadcasting device, the response comprising the identifier of the broadcasting device; and receiving, by the broadcasting device, a second wake-up packet from the wireless-local area network access point, the second wake-up packet identifying the broadcasting device as being de-selected and indicating that the broadcasting device is not allowed to send a response to the second wake-up packet.

15. The method according to claim 9, wherein the broadcasting device does not support performing a listen-before-talk procedure for before sending the response.

16. The method according to claim 9, wherein said determining comprises:

determining a result of the XOR operation by, only for each bit of the data mask that has a value of one, XORing the bit of the data mask with a respective bit of the identifier of the broadcasting device; and determining whether the broadcasting device is allowed to send the response, based on whether the result of the XOR operation is zero.

17. A wireless-local area network access point comprising:

at least one processor; and a memory, the memory containing instructions executable by the at least one processor whereby the wireless-local area network access point is configured to:

send a wake-up packet which is receivable by broadcasting devices in vicinity of the wireless-local area network access point and which has the purpose of activating a subset of the broadcasting devices, wherein the subset includes multiple broadcasting devices; and in response to the wake-up packet, receive responses from the broadcasting devices in the subset, each response comprising an identifier of the broadcasting device sending the response;

wherein the wake-up packet coordinates the sending of the responses by the broadcasting devices with respect to each other; and wherein the wake-up packet comprises a data mask configured to select the multiple broadcasting devices in the subset that are to send a response to the wake-up packet, wherein the data mask is to be combined, by an XOR operation, with an identifier of a broadcasting device for enabling the broadcasting device to determine whether the broadcasting device is allowed to send a response, wherein the data mask is a binary sequence of the same length as used for representing identifiers of the broadcasting devices, wherein the data mask has a value of one in one or more positions of the binary sequence, and wherein the subset of broadcasting devices includes any broadcasting devices whose identifiers have a value of one in those same one or more positions.

18. The wireless-local area network access point according to claim 17, wherein the wake-up packet indicates information for controlling the sending of a response by a respective broadcasting device.

19. The wireless-local area network access point according to claim 17, wherein the wake-up packet indicates a frequency channel to be used for sending of a response by a respective broadcasting device.

20. The wireless-local area network access point according to claim 17, wherein the wake-up packet comprises timing information for controlling a timing of sending of a response by a respective broadcasting device, wherein the timing information comprises a target time after which the broadcasting device is allowed to send the response or comprises a contention window for controlling a random backoff applied by the broadcasting device before sending the response.

21. The wireless-local area network access point according to claim 17, the memory containing instructions executable by the at least one processor whereby the wireless-local area network access point is configured to send multiple wake-up packets for activating broadcasting devices in vicinity of the wireless-local area network access point, wherein the multiple wake-up packets are sent with different transmit powers to coordinate the sending of the responses by the broadcasting devices.

22. The wireless-local area network access point according to claim 17, the memory containing instructions executable by the at least one processor whereby the wireless-local area network access point is configured to:

using a first transmit power, send a first wake-up packet for activating broadcasting devices in vicinity of the wireless-local area network access point;

in response to detecting a congestion of a channel used by the broadcasting devices for sending responses to the first wake-up packet, send, using a second transmit power that is lower than the first transmit power, a second wake-up packet for activating broadcasting devices in vicinity of the wireless-local area network access point; and in response to the second wake-up packet, receive one or more responses from one or more of the broadcasting devices, each response comprising an identifier of the broadcasting device sending the response.

23. The wireless-local area network access point according to claim 17, the memory containing instructions executable by the at least one processor whereby the wireless-local area network access point is configured to:

send a first wake-up packet for activating broadcasting devices in vicinity of the wireless-local area network access point;

in response to the first wake-up packet, receive one or more responses from one or more of the broadcasting devices, each response comprising an identifier of the broadcasting device sending the response;

de-select one or more broadcasting devices corresponding to one or more identifiers received in the one or more responses; and send a second wake-up packet for activating broadcasting devices in vicinity of the wireless-local area network access point, the second wake-up packet identifying the one or more de-selected broadcasting devices and indicating that the one or more de-selected broadcasting devices are not allowed to send a response to the second wake-up packet.

24. The wireless-local area network access point according to claim 17, wherein the broadcasting devices do not support performing a listen-before-talk procedure for before sending the response.

25. The wireless-local area network access point according to claim 17, the memory containing instructions executable by the at least one processor whereby the wireless-local area network access point is configured to generate the data mask as a function of a maximum number of broadcasting devices that are allowed to send a response to the wake-up packet.

26. The wireless-local area network access point according to claim 17, the memory containing instructions executable by the at least one processor whereby the wireless-local area network access point is configured to generate the data mask to select a random subset of the broadcasting devices as being allowed to send a response to the wake-up packet.

27. A broadcasting device comprising:

at least one processor; and a memory, the memory containing instructions executable by the at least one processor whereby the broadcasting device is configured to:

receive a wake-up packet from a wireless-local area network access point, wherein the wake-up packet is receivable by broadcasting devices in vicinity of the wireless-local area network access point and has the purpose of activating a subset of the broadcasting devices, wherein the subset includes multiple broadcasting devices, wherein the wake-up packet coordinates the sending of the response by the broadcasting device with respect to sending of responses to the wake-up packet by the other broadcasting devices in the vicinity of the wireless-local area network access point, and wherein the wake-up packet comprises a data mask configured to select the multiple broadcasting devices in the subset that are to send a response to the wake-up packet, wherein the data mask is a binary sequence of the same length as used for representing respective identifiers of the broadcasting devices, wherein the data mask has a value of one in one or more positions of the binary sequence, and wherein the subset of broadcasting devices includes any broadcasting devices whose identifiers have a value of one in those same one or more positions;

determine whether the broadcasting device is allowed to send a response to the wake-up packet, by using an XOR operation to combine the data mask with the identifier of the broadcasting device; and based on determining that the broadcasting device is allowed to send a response to the wake-up packet, in response to the wake-up packet, send a response comprising the identifier of the broadcasting device.

28. The broadcasting device according to claim 27, wherein the wake-up packet indicates information for controlling the sending of the response by the broadcasting device.

29. The broadcasting device according to claim 27, wherein the wake-up packet indicates a radio channel to be used for sending of the response by the broadcasting device.

30. The broadcasting device according to claim 27, the memory containing instructions executable by the at least one processor whereby the broadcasting device is configured to:

determine a result of the XOR operation by, only for each bit of the data mask that has a value of one, XORing the bit of the data mask with a respective bit of the identifier of the broadcasting device; and determine whether the broadcasting device is allowed to send the response, based on whether the result of the XOR operation is zero.

* * * * *